(12) United States Patent
Kusuda et al.

(10) Patent No.: US 7,527,226 B2
(45) Date of Patent: May 5, 2009

(54) CABLE CLAMP

(75) Inventors: Kiyonori Kusuda, Kawasaki (JP); Hisato Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/520,825

(22) Filed: Sep. 14, 2006

(65) Prior Publication Data

US 2007/0221793 A1 Sep. 27, 2007

(30) Foreign Application Priority Data

Mar. 24, 2006 (JP) ............................. 2006-082266

(51) Int. Cl.
*F16B 15/00* (2006.01)
(52) U.S. Cl. .................. 248/71; 248/68.1; 248/74.1
(58) Field of Classification Search ............... 248/121, 248/71, 74.1, 74.2, 74.5, 68.1, 49, 73; 361/826; 385/136; 379/438
See application file for complete search history.

(56) References Cited

U.S. PATENT DOCUMENTS

| | | | | | |
|---|---|---|---|---|---|
| 3,444,596 | A | * | 5/1969 | Soltysik | 248/73 |
| 3,991,960 | A | * | 11/1976 | Tanaka | 248/68.1 |
| 4,023,758 | A | * | 5/1977 | Yuda | 248/73 |
| 4,681,288 | A | * | 7/1987 | Nakamura | 248/71 |
| D329,588 | S | * | 9/1992 | Michel, Jr. | D8/395 |
| 5,797,566 | A | * | 8/1998 | Sato | 248/49 |
| 5,929,381 | A | * | 7/1999 | Daoud | 174/72 A |
| 6,161,803 | A | * | 12/2000 | Daoud | 248/68.1 |
| 6,220,554 | B1 | * | 4/2001 | Daoud | 248/74.1 |
| 6,370,246 | B1 | * | 4/2002 | Daoud | 379/438 |
| 6,371,419 | B1 | * | 4/2002 | Ohnuki | 248/74.2 |
| D473,449 | S | * | 4/2003 | Wu et al. | D8/356 |
| 6,614,981 | B2 | * | 9/2003 | Zdinak et al. | 385/136 |
| 6,665,484 | B2 | * | 12/2003 | Douglas et al. | 385/136 |
| 7,182,299 | B2 | * | 2/2007 | Takeuchi | 248/71 |
| 7,210,658 | B2 | * | 5/2007 | Carrera | 248/74.1 |

FOREIGN PATENT DOCUMENTS

JP 2002-262441 A 9/2002

* cited by examiner

*Primary Examiner*—Anita M King
(74) *Attorney, Agent, or Firm*—Hanify & King, P.C.

(57) ABSTRACT

A cable clamp which is capable of preventing even a very fine cable to be treated from coming off or extending off therefrom, without any fear of the cable being damaged or broken, and is easy to carry out a clamping treatment and an extra length-bunching treatment on cables, with enhanced workability. The cable clamp includes a pair of cable-holding bodies each including a pillar portion vertically extending from the base, and a cantilever portion extending from an end of the pillar portion, remote from the base, in a direction substantially at right angles to the pillar portion. The pair of cable-holding bodies are configured such that the pillar portions are arranged to extend in opposite directions, with one of respective side surfaces of the respective cantilever portions being opposed to the other with a predetermined space therebetween.

3 Claims, 6 Drawing Sheets

CABLE CLAMP

CROSS-REFERENCE TO RELATED APPLICATIONS

This application is based upon and claims the benefits of priority from the prior Japanese Patent Application No. 2006-082266, filed on Mar. 24, 2006, the entire contents of which are incorporated herein by reference.

BACKGROUND OF THE INVENTION

1. Field of the Invention

This invention relates to a cable clamp for holding cables in communication equipment and electronic equipment, and more particularly to a cable clamp suitable for clamping very fine cables.

2. Description of the Related Art

Recently, an increase in channel capacity is being demanded of communication equipment and electronic equipment. Further, the thickness of transmission cables installed in the equipment has been decreased according to the progress of manufacturing techniques. Particularly, in the communication equipment, to provide a high-speed and stable communication quality, optical transmission using optical fiber cables has been becoming dominant. In an optical communication unit, an optical fiber cable is clamped within the unit and an extra length of the cable is bunched. To carry out such treatment on optical fiber cables, cable clamps are used.

FIGS. 4A, 4B, and 4C are diagrams showing examples of conventional cable clamps for treating cables of a general type, wherein FIG. 4A shows an M clamp; FIG. 4B shows an openable clamp, and FIG. 4C shows a twist clamp.

The M clamp 101 shown in FIG. 4A has an open central portion, and downward sloping portions extend from opposite sides so as to provide a guide for cables 100 as they are pushed in through the open central portion. The M clamp 101 has a means for having itself fixed to a chassis or a printed wiring board. The cables 100 are inserted into the M clamp 101 to be held therein, by being pushed in through the central open portion.

The openable clamp 102 shown in FIG. 4B has an opening and closing mechanism a top of which is openable. The cables 100 are caused to be received in the clamp 102 by opening the opening and closing mechanism, and are held therein by closing the opening and closing mechanism thereafter.

The twist clamp 103 shown in FIG. 4C is in the form of a string having retaining portions at opposite ends thereof. The cables 100 are received and wound by the clamp 103 which is set open in advance, and thereafter the clamp 103 is twisted, whereby the cables 100 are tied together and held in the clamp 103.

FIG. 5 is a perspective view showing an example of the arrangement of an optical communication unit using conventional cable clamps. FIGS. 6A and 6B are perspective views useful in explaining how the optical fiber cables are treated using the above-described conventional openable clamp, wherein FIG. 6A shows an open state of the opening and closing mechanism, and FIG. 6B shows a closed state of the same.

In the case of the optical communication unit shown in FIG. 5, the openable clamps 102 shown in FIG. 4B are used. The clamps 102 are fixedly arranged at respective predetermined locations on the printed wiring board 104, etc. within the optical communication unit, and a clamping treatment and an extra length-bunching treatment are carried out on the optical fiber cables 105 introduced into the clamps 102.

The clamping treatment and the extra length-bunching treatment are carried out by receiving the cables 105 into the opening and closing mechanism in the open state as shown in FIG. 6A and then closing the same, as shown in FIG. 6B.

Further, there has also been proposed a cable clamp particularly suitable for treating flat cables (see e.g. Japanese Unexamined Patent Publication No. 2002-262441). This cable clamp is comprised of sandwiching boards for sandwiching the flat cable and a guide bar, and holds the cable by sandwiching the cable between the sandwiching boards and rotating the cable and the boards. In the case of this cable clamp, the cable is clamped by applying an external pressure thereto to press it down for retainment.

However, the above-described conventional cable clamp is not very suitable for treating the optical fiber cables. More specifically, the optical fiber cables having come into wide use for attaining very high speed transmission and very large channel capacity communication so as to cope with the broadband era have become very fine, that is, the diameter thereof has been changed e.g. from 0.9 mm or 0.4 mm to 0.25 mm. Some cables having very small diameters as described above are very nearly transparent, and difficult to visually recognize just as in the case of fishing lines. They tend to be entwined, caught, or sandwiched during the clamping or extra length-bunching treatment, which makes it very difficult to work on them and makes the cables easy to be broken. When such very fine cables are treated by the conventional cable clamps, they are liable to come off or extend off from the clamps, and are also liable to be broken.

For example, in the M clamp having an open central portion, cables received therein are liable to come off from the open portion. When cables come off from the clamp, they are caught within the apparatus, which can cause breakage thereof. The openable clamp has a lock structure for locking cables by the opening and closing mechanism thereof, and hence cables tend to be caught by a hook or extend off, as shown in FIGS. 6A and 6B, which causes breakage of the cables, similarly to the M clamp. The breakage of cables is liable to occur especially when cables are wound a plurality of times by the extra length-bunching treatment into a loop. Further, workability is low, and when a long cable is treated, the cable is required to be wound a larger number of times by the extra length-bunching treatment, which makes the winding operation troublesome. In the twist clamp which is twisted after receiving cables, workability of the clamp is low especially when fine cables are treated.

SUMMARY OF THE INVENTION

The present invention has been made in view of the above-described problems, and an object thereof is to provide a cable clamp which is capable of preventing even a very fine cable to be treated from coming off or extending off therefrom, without any fear of the cable being damaged or broken, and is easy to carry out a clamping treatment and an extra length-bunching treatment on cables, with enhanced workability.

To attain the above object, the present invention provides a cable clamp for holding a cable. The cable clamp is characterized by comprising a base, a pair of cable-holding bodies each including a pillar portion vertically extending from the base, and a cantilever portion extending from an end of the pillar portion, remote from the base, in a direction substantially at right angles to the pillar portion, and an anchor portion provided on a side of the base, opposite from the pillar portions, such that the anchor portion vertically extends from a center of the base for being inserted through a mounting board, wherein the pair of cable-holding bodies are configured such that the pillar portions are arranged to extend in opposite directions, with one of respective side surfaces of the cantilever portions being opposed to the other with a predetermined space therebetween.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 1A, 1B, and 1C are views showing the construction of a cable clamp according to an embodiment of the present invention, wherein FIG. 1A is a plan view of the cable clamp; FIG. 1B is a front view of the cable clamp; and FIG. 1C is a right side view of the cable clamp.

FIGS. 4A, 4B, and 4C are diagrams showing examples of conventional cable clamps for treating cables of a general type, wherein FIG. 4A shows an M clamp; FIG. 4B shows an openable clamp; and FIG. 4C shows a twist clamp.

FIGS. 6A and 6B are perspective views useful in explaining how optical fiber cables are treated by the conventional openable clamp, wherein FIG. 6A shows an open state of an opening and closing mechanism; and FIG. 6B shows a closed state of the opening and closing mechanism.

DESCRIPTION OF THE PREFERRED EMBODIMENTS

The invention will now be described in detail with reference to drawings showing a preferred embodiment thereof.

Figure 1A:
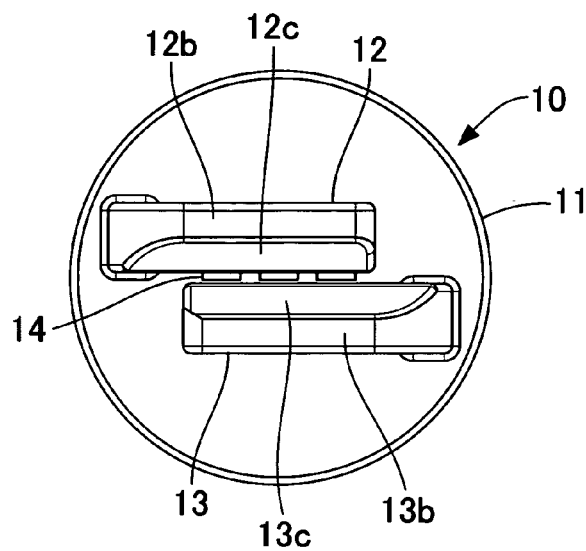
Figure 1B:
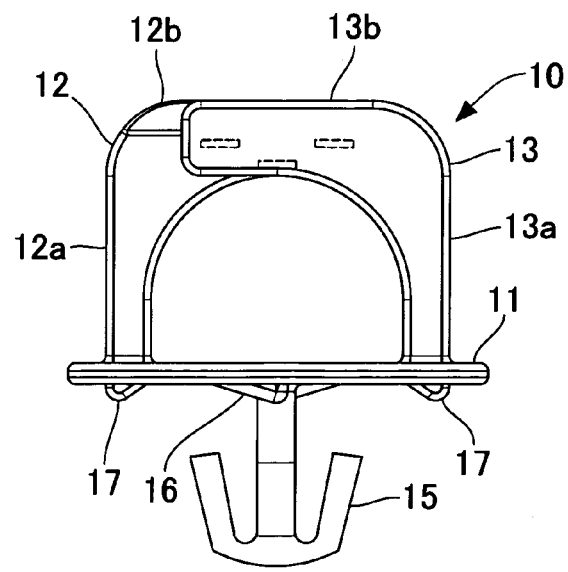
Figure 1C:
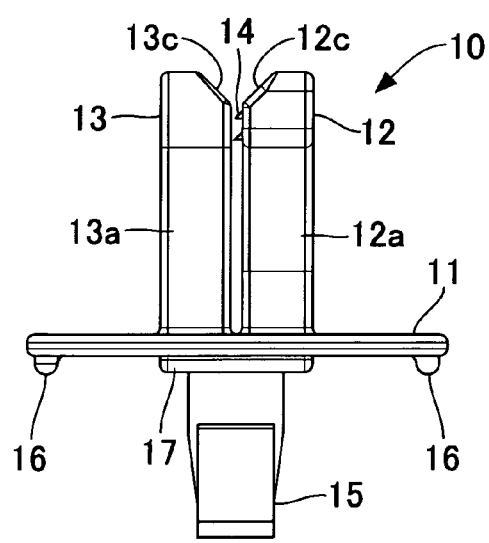

FIGS. 1A, 1B, and 1C are views showing the construction of a cable clamp according to an embodiment of the present invention, wherein FIG. 1A is a plan view of the cable clamp; FIG. 1B is a front view of the cable clamp; and FIG. 1C is a right side view of the cable clamp. The cable clamp 10 includes a pair of cable-holding bodies 12 and 13 secured to a base 11. The cable-holding bodies 12 and 13 each have an inverted L-shape or an arcuate shape and are respectively comprised of pillar portions 12a and 13a vertically extending from the base 11, and cantilever portions 12b and 13b extending from respective ends of the pillar portions 12a and 13a remote from the base 11, in respective directions substantially at right angles to the pillar portions 12a and 13a.

The above pair of cable-holding bodies 12 and 13 are arranged to extend in opposite directions such that one of respective side surfaces of the pillar portions 12b and 13b is opposed to the other, with a predetermined gap therebetween. This gap is provided for inserting a very fine cable therethrough.

Further, at least one of the cantilever portions 12b and 13b of the pair of cable-holding bodies 12 and 13, opposed to each other, has a side surface formed with a plurality of sawtoothed protrusions 14. The protrusions 14 have a shape sloping (downward) toward the base 11, for ensuring the insertability of the very fine cable and preventing the same from popping out or extending off from within the cable clamp 10. In the illustrated example, the protrusions 14 are provided on a side surface of the cantilever portion 12b of the cable-holding body 12. Further, sloping surfaces 12c and 13c opposed to each other are formed on respective ends of the cantilever portions 12b and 13b, remote from the base 11. The sloping surfaces 12c and 13c form guide surfaces for positioning and smooth insertion of the very fine cable.

Further, the base 11 is in the form of a disk, and has an anchor portion 15 provided at a central portion of a reverse surface (lower surface) of the base 11, opposite from the cable-holding bodies 12 and 13. The anchor portion 15 is pushed into a mounting hole 21 formed through a mounting board 20 (see FIG. 2), for mounting the cable clamp 10 to the mounting board 20. The anchor portion 15 has an open leg portion formed at an end thereof, for preventing the cable clamp 10 from coming off the mounting board 20, and serves as a pivot about which the cable clamp 10 is pivoted after the anchor portion 15 has been inserted into the mounting hole 21. Furthermore, two projections 16 and two raised portions 17 are circumferentially alternately arranged on a peripheral portion of the reverse surface of the base 11. The projections 16 are tapered such that the cable clamp 10 can rotate in one direction by crossing over engaging holes 22 (see FIG. 2) formed in the mounting board 20, when the cable clamp 10 is rotated about the anchor portion 15 after being mounted in the mounting hole 21.

Figure 2A:
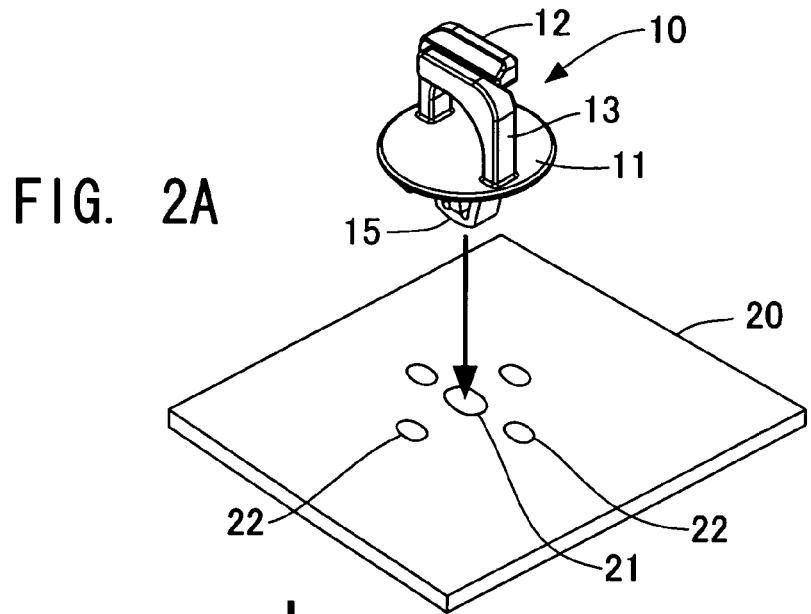
FIGS. 2A, 2B, and 2C are diagrams useful in explaining a procedure for mounting the cable clamp, and a procedure for treating a cable.
Figure 2B:
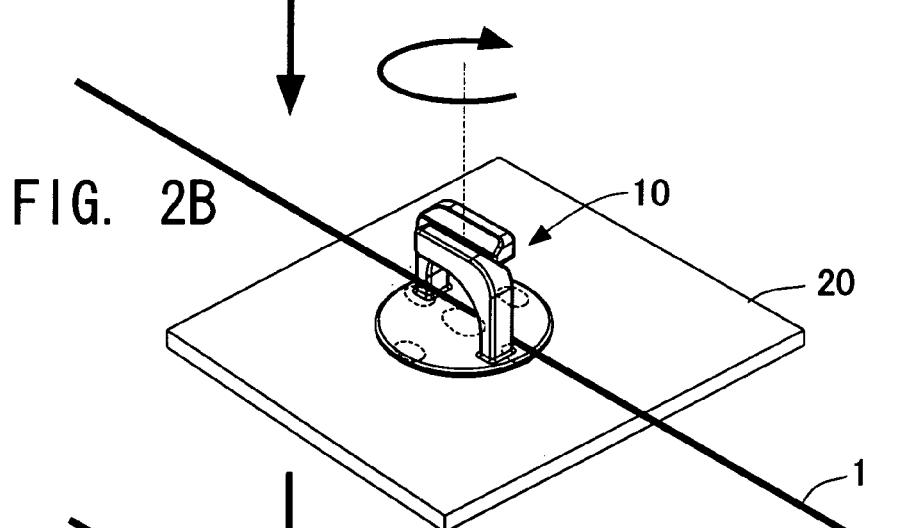
Figure 2C:
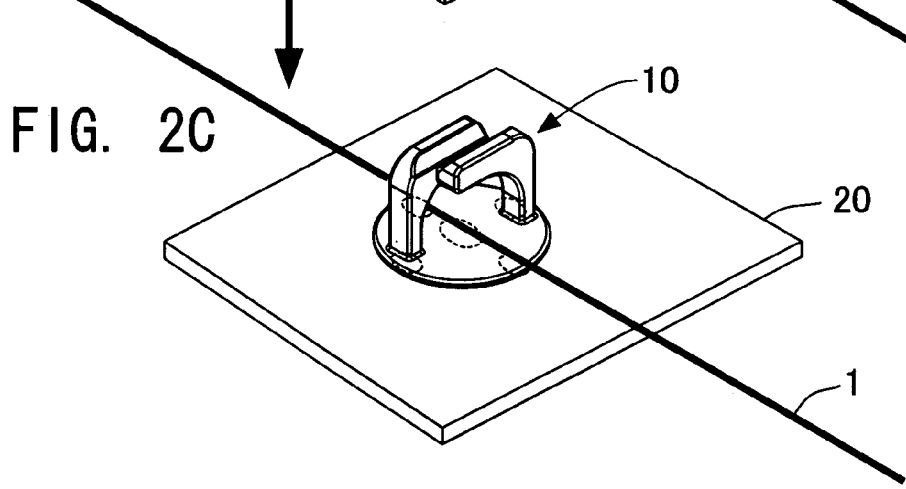

FIGS. 2A, 2B, and 2C are diagrams useful in explaining a procedure for mounting the cable clamp, and a procedure for treating the cable.

The mounting board 20 e.g. of a printed circuit board, on which the cable clamp 10 is to be mounted, is formed with the mounting hole 21, and the four engaging holes 22 are formed on a concentric circle around the mounting hole 21.

To mount the cable clamp 10 on the mounting board 20, first, as shown in FIG. 2A, the anchor portion 15 provided on the lower surface of the base 11 in the form of a disk is pushed into the mounting hole 21 formed through the mounting board 20 in a direction indicated by an arrow. The anchor portion 15, which is formed with the open leg, is difficult to come off from the mounting board 20. In doing this, the cable clamp 10 is inserted such that the direction of extension of the cantilever portions 12b and 13b extending from the pillar portions 12a and 13a matches the direction of extension of the very fine cable 1 which is to be held by the clamp 10. At this time, the projections 16 are engaged with the associated engaging holes 22, which inhibits the cable clamp 10 from being easily rotated.

Then, as shown in FIG. 2B, the very fine cable 1 is inserted from the gap between the cantilever portions 12b and 13b of the cable-holding bodies 12 and 13 of the cable clamp 10. After that, the cable clamp 10 is rotated through 90 degrees in a direction indicated by an arrow (in the clockwise direction), by holding the opposed ends of the cantilever portions 12b and 13b. As a result, as shown in FIG. 2C, the very fine cable 1 is positively received between the pair of cable-holding bodies 12 and 13 and the base 11. This prevents the very fine cable 1 from popping out or extending off from the cable clamp 10. Therefore, it is possible to positively clamp the very fine cable 1 without missing the same.

Further, when the cable clamp 10 is rotated through 90 degrees, the projections 16 arranged on the reverse surface of the base 11 are engaged with the engaging holes 22 in the mounting board 20 for locking the rotation of the cable clamp 10, which makes it easy to position them. In doing this, since the projections 16 each have a low tapered portion formed along the direction of rotation of the cable clamp 10, they are easy to rotate in the direction of rotation of the cable clamp 10 but difficult to rotate in the reverse direction (counterclockwise direction).

As described above, by rotating the cable clamp 10 after the very fine cable 1 is held within the pair of cable-holding bodies 12 and 13, the direction of the extension of the very fine cable 1 and the direction of the length of the gap for inserting the cable 1 are made orthogonal to each other, which makes it possible to reliably clamp the cable 1. In doing this, it is possible to mount the cable 1 quickly without the cable 1 being caught on the clamp body, since the cable clamp 10 has neither a lock structure nor movable parts, such as those of the opening and closing mechanism. This makes it possible to prevent the cable 1 from coming off or extending off from the cable clamp 10, and hence there is no fear of the cable 1 being damaged or broken. Further, it is possible to provide a high-quality product of the cable clamp 10 which makes it easy to carry out the clamping treatment and the extra length-bunching treatment on the cable 1, with excellent workability, using the cable-holding bodies 12 and 13.

Figure 3:
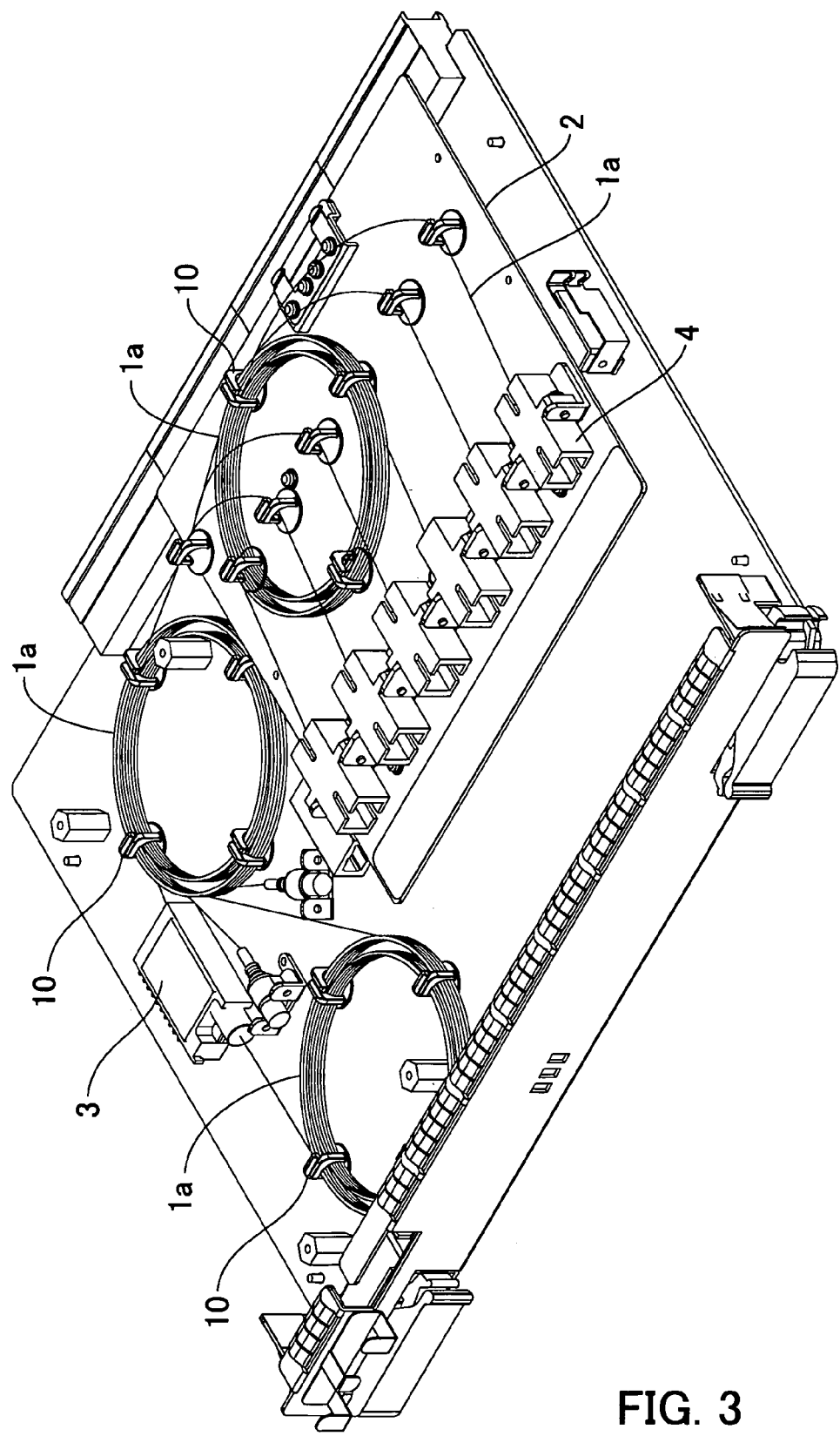
FIG. 3 is a perspective view showing an example of the arrangement of an optical communication unit using the cable clamps.
Figure 4A:
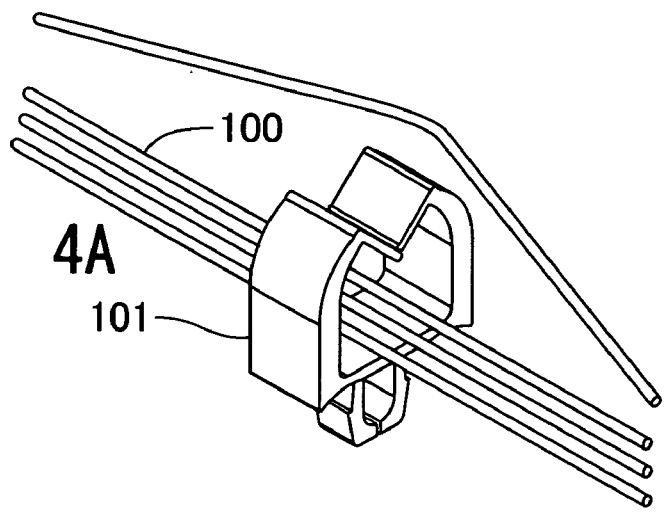
Figure 4B:
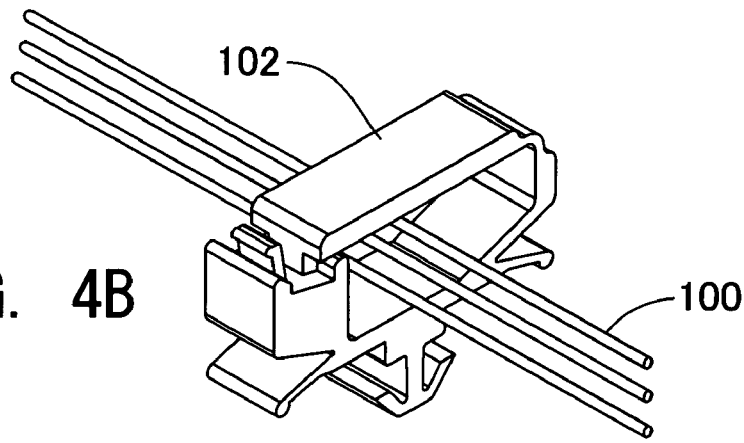
Figure 4C:
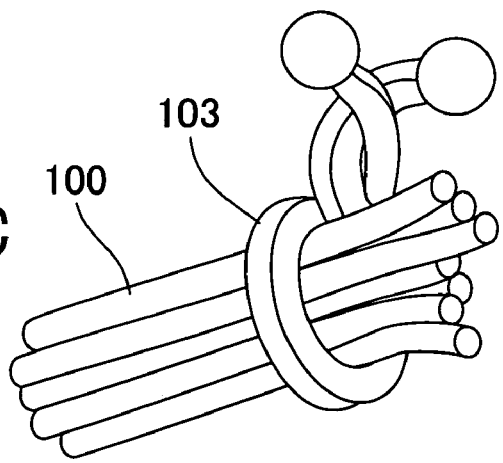
Figure 5:
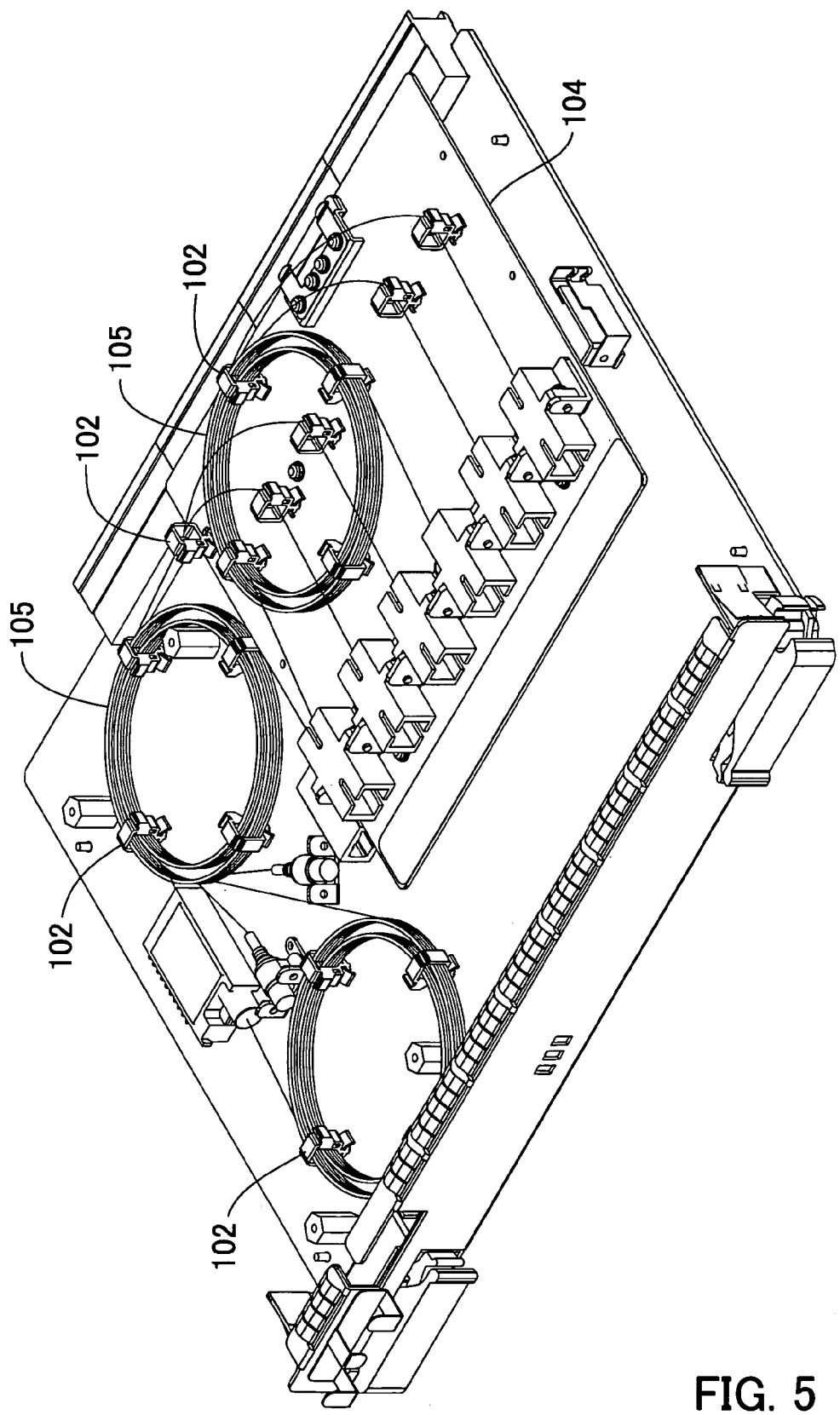
FIG. 5 is a perspective view showing an example of the arrangement of an optical communication unit using conventional cable clamps.
Figure 6A:
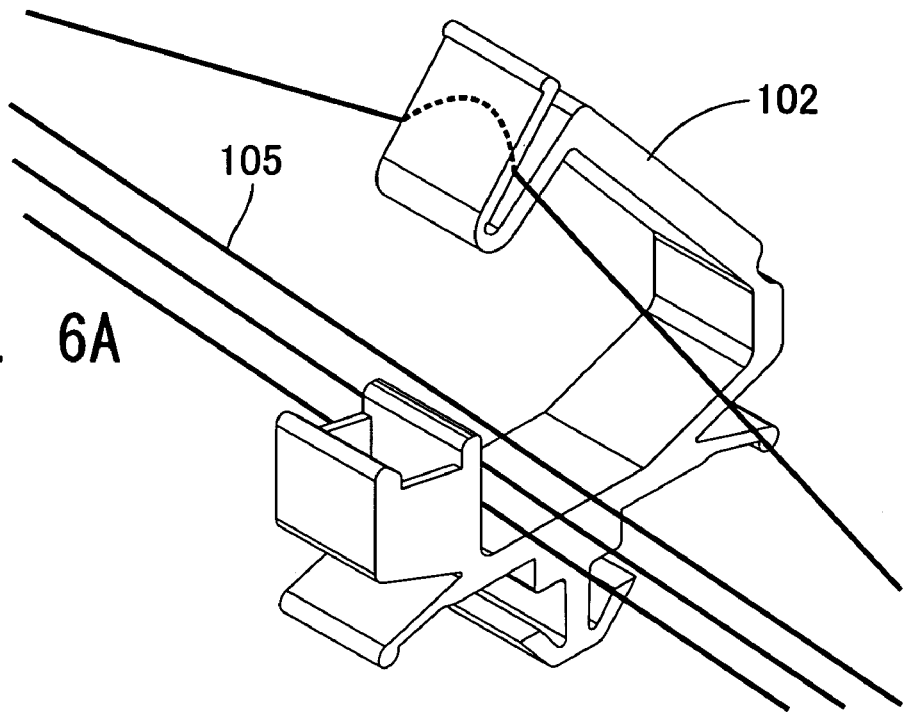
Figure 6B:
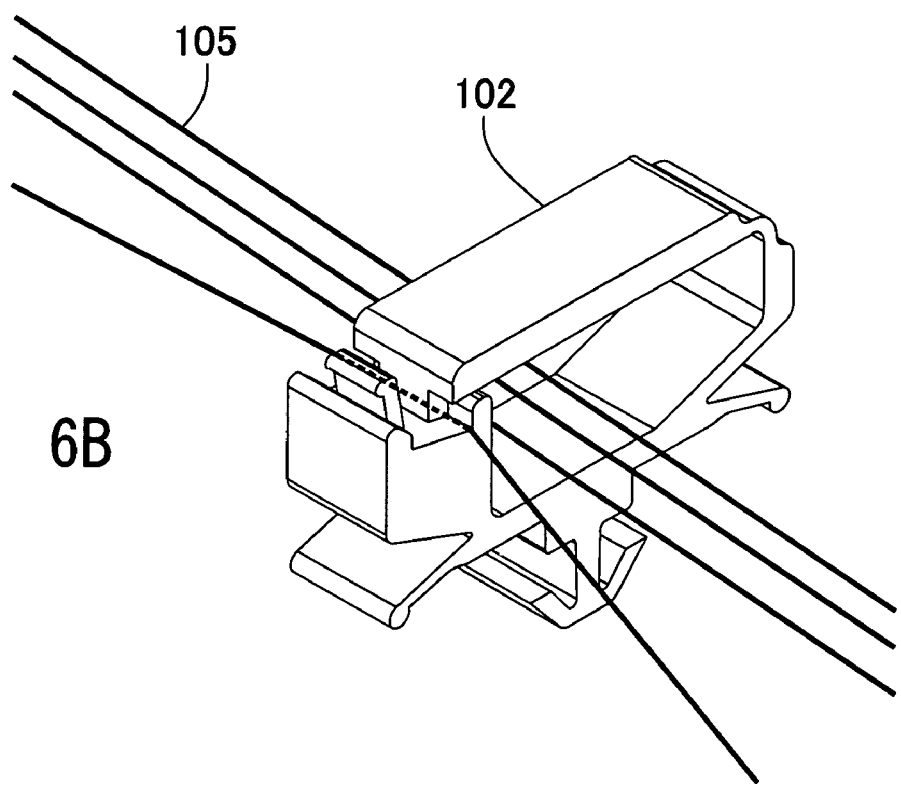

FIG. 3 is a perspective view showing an example of the arrangement of an optical communication unit using the cable clamps.

The optical communication unit has the printed circuit board 2, an optical device 3, relay adapters 4, and so forth, installed therein. Further, the optical communication unit has the cable clamps 10 fixed to predetermined locations where very fine optical fiber cables 1a should be disposed. To assemble the optical communication unit, the optical device 3 is mounted on the unit, whereafter the extra length-bunching treatment of the very fine optical fiber cables 1a, and connection of the optical fiber cables 1a to the relay adapters 4 are carried out. In the extra length-bunching treatment for layout of the cable 1a, the cable clamps 10 enable the cable 1a to be easily accommodated within the optical communication unit, which makes it easy to assemble and manufacture the optical communication unit. Further, when in use, the optical communication unit is normally inserted into an apparatus body (shelf). The optical fiber cables 1a do not extend off the cable clamp 10, but can be positively clamped, and hence there is no fear of breaking of the optical fiber cables 1a. This makes it possible to realize a high-quality optical communication unit.

The cable clamp 10 according to the present embodiment has a simple construction which allows the optical fiber cable 1a to be inserted therein from above, and the height of the pillar portions 12a and 13a of the pair of cable-holding bodies 12 and 13 can be determined depending on the number of windings of the optical fiber cables 1a to be received in the cable clamp 10. Therefore, it is easy to form the cable clamp 10 such that it has a low profile construction. This makes it possible to make the cable clamp 10 compact in size, and compatible with small-sized electronic equipment, thereby giving high general-purpose properties to the cable clamp 10.

Further, the mounting hole 21 and the engaging holes 22 formed in the mounting board 20 for mounting of the cable clamp 10 and providing a lock mechanism for locking the rotation of the cable clamp 10 can be formed into circular holes. This makes it easy to drill the holes, without requiring a special punching process, so that the cable clamp can be manufactured at low costs.

In the cable clamp according to the present invention, the pair of cable-holding bodies each comprised of the pillar portion and the cantilever portion are configured such that the pillar portions are arranged to extend in opposite directions, with one of respective side surfaces of the cantilever portions being opposed to the other with a predetermined space therebetween. Therefore, even when a very fine cable is treated, by rotating the pair of cable-holding bodies after the cable is received within the pair of cable-holding bodies, the cable can be prevented from coming off or extending off from the cable clamp. As a result, the cable clamp is advantageous in that there is no fear of the cable being damaged or broken, and it is easy to carry out the clamping treatment and the extra length-bunching treatment on the cable with enhanced workability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A cable clamp for holding a cable, comprising:
    a base;
    a pair of cable-holding bodies each including a pillar portion vertically extending from said base, and a cantilever portion extending from an end of said pillar portion, remote from said base, in a direction substantially at right angles to said pillar portion; and
    an anchor portion provided on a side of said base, opposite from said pillar portions, such that said anchor portion vertically extends from a center of said base for being inserted through a mounting board,
    wherein said pair of cable-holding bodies are configured such that said pillar portions are arranged to extend in opposite directions, with one of respective side surfaces of said cantilever portions being opposed to the other with a predetermined space therebetween and wherein said pair of cable-holding bodies have sawtoothed protrusions formed on at least one of said cantilever portions said cantilever portions being opposed to each other, and
    said base mounted on said mounting board can be rotated relative to the mounting board with said anchor portion as a pivot.

2. The cable clamp according to claim 1, wherein said pair of cable-holding bodies have sloping surfaces formed at ends of said opposed cantilever portions, remote from said base.

3. The cable clamp according to claim 1, wherein said base is in a form of a disk, and has tapered projections arranged on a peripheral portion of a surface thereof on which said anchor portion is provided.

* * * * *